United States Patent
Jung et al.

(10) Patent No.: US 8,755,451 B2
(45) Date of Patent: Jun. 17, 2014

(54) METHOD FOR TRANSMITTING PRECODED SIGNAL IN COLLABORATIVE MULTIPLE-INPUT MULTIPLE-OUTPUT COMMUNICATION SYSTEM

(75) Inventors: Jin Hyuk Jung, Seoul (KR); Su Nam Kim, Seoul (KR); Bin Chul Ihm, Anyang-si (KR); Jae Wan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 12/811,175

(22) PCT Filed: Dec. 30, 2008

(86) PCT No.: PCT/KR2008/007795
§ 371 (c)(1),
(2), (4) Date: Jun. 29, 2010

(87) PCT Pub. No.: WO2009/084903
PCT Pub. Date: Jul. 9, 2009

(65) Prior Publication Data
US 2010/0309998 A1 Dec. 9, 2010

(30) Foreign Application Priority Data
Dec. 31, 2007 (KR) .................. 10-2007-0141799

(51) Int. Cl.
*H04B 7/02* (2006.01)
(52) U.S. Cl.
USPC ........................................ 375/267
(58) Field of Classification Search
USPC ........................................ 375/267
See application file for complete search history.

(56) References Cited

U.S. PATENT DOCUMENTS

| 7,136,665 | B2 * | 11/2006 | Ida et al. ............... 455/522 |
| 7,859,990 | B2 * | 12/2010 | Mudulodu et al. ...... 370/210 |
| 8,027,301 | B2 * | 9/2011 | Oyman et al. .......... 370/330 |
| 2002/0082036 | A1 * | 6/2002 | Ida et al. ............... 455/522 |
| 2004/0063430 | A1 * | 4/2004 | Cave et al. ............. 455/436 |

(Continued)

FOREIGN PATENT DOCUMENTS

| EP | 1780925 A2 | 5/2007 |
| JP | 2007-174677 A | 7/2007 |

(Continued)

OTHER PUBLICATIONS

Yang Song et al: "Collaborative MIMO Based on Multiple Base Station Coordination IEEE 802.16 Presentation Submission Template (Rev. 9); S80216M-07__163", xp017795796, Aug. 29, 2007.

(Continued)

*Primary Examiner* — Jaison Joseph
(74) *Attorney, Agent, or Firm* — McKenna Long & Aldridge LLP (57) ABSTRACT

A method for transmitting a precoded signal in a collaborative multiple-input multiple-output (MIMO) communication system is described. A method for receiving a precoded signal in a MIMO communication system includes estimating, by a mobile station, channels for one or more base stations through signals received from the one or more base stations including a serving base station, transmitting precoding matrix indexes of the one or more base stations determined based on the estimated channels to the serving base station, and receiving signals precoded by the one or more base stations based on the precoding matrix index.

4 Claims, 9 Drawing Sheets

(56) References Cited

U.S. PATENT DOCUMENTS

| | | |
|---|---|---|
| 2006/0120477 A1 | 6/2006 | Shen et al. |
| 2006/0215559 A1* | 9/2006 | Mese et al. ............... 370/232 |
| 2006/0279460 A1* | 12/2006 | Yun et al. ................. 342/377 |
| 2007/0025454 A1* | 2/2007 | Jones et al. ............... 375/260 |
| 2007/0097889 A1 | 5/2007 | Wang et al. |
| 2007/0099665 A1* | 5/2007 | Kim et al. ................. 455/561 |
| 2007/0123272 A1* | 5/2007 | Ida et al. .................. 455/456.1 |
| 2007/0191066 A1* | 8/2007 | Khojastepour et al. .... 455/562.1 |
| 2007/0248052 A1* | 10/2007 | Nagaraj et al. ............ 370/331 |
| 2007/0248172 A1 | 10/2007 | Mehta et al. |
| 2008/0080634 A1* | 4/2008 | Kotecha et al. ............ 375/267 |
| 2008/0175140 A1* | 7/2008 | Mudulodu et al. ......... 370/210 |
| 2008/0214185 A1* | 9/2008 | Cho et al. .................. 455/424 |
| 2009/0067375 A1* | 3/2009 | Wong et al. ............... 370/329 |
| 2010/0284359 A1* | 11/2010 | Kim et al. ................. 370/329 |
| 2010/0309996 A1* | 12/2010 | Lim et al. .................. 375/260 |
| 2011/0064154 A1* | 3/2011 | Mudulodu et al. ......... 375/260 |
| 2011/0170427 A1* | 7/2011 | Koivisto et al. ........... 370/252 |
| 2012/0071181 A1* | 3/2012 | Guillouard et al. ........ 455/500 |

FOREIGN PATENT DOCUMENTS

| | | |
|---|---|---|
| KR | 10-2006-0113973 A | 3/2006 |
| KR | 10-2006-0097519 A | 9/2006 |
| KR | 10-2006-0119144 A | 11/2006 |
| KR | 10-2007-0079788 A | 8/2007 |
| KR | 10-0779172 | 11/2007 |
| KR | 10-2007-0119178 | 12/2007 |
| WO | WO 2007/051192 A2 | 5/2007 |

OTHER PUBLICATIONS

Yang Song et al: "Collaborative MIMO", IEEE Broadband Wireless Access Working Group, XP008136503, Nov. 7, 2007.

* cited by examiner

METHOD FOR TRANSMITTING PRECODED SIGNAL IN COLLABORATIVE MULTIPLE-INPUT MULTIPLE-OUTPUT COMMUNICATION SYSTEM

This application is a national phase application based on International Application No. PCT/KR2008/007795, filed on Dec. 30, 2008, which claims priority to Korean Patent Application No. 0-2007-0141799, filed on Dec. 31, 2007, all of which are incorporated by reference for all purposes as if fully set forth herein.

TECHNICAL FIELD

The present invention relates to a collaborative multiple-input multiple-output (MIMO) communication system, and more particularly, to a method for transmitting a precoded signal in a collaborative MIMO communication system.

BACKGROUND ART

With the popularization of information communication services, the emergence of various multimedia services, and the provision of high-quality services, demand for a wireless communication service has rapidly increased. To actively cope with such demand, the capacity of a communication system should be increased and the reliability of data transmission should be improved.

To increase communication capacity in wireless communication environments, a method for newly searching available frequency bands and a method for increasing efficiency for limited resources may be considered. As to the latter method, a multiple-input multiple-output (MIMO) scheme has recently drawn attention and has been actively developed. The MIMO scheme obtains a diversity gain by equipping a transmitter and a receiver with a plurality of antennas to additionally ensure a spatial region for utilizing resources, or increases transmission capacity by transmitting data in parallel through the plurality of antennas.

Generally, the MIMO scheme is considered to raise the reliability of a communication system or to improve transmission efficiency and may be classified into beamforming, spatial diversity, and spatial multiplexing schemes.

The beamforming scheme and spatial diversity scheme, which use multiple transmit antennas to raise reliability, transmit a single data stream through multiple transmit antennas. The spatial multiplexing scheme, used to raise transmission efficiency, simultaneously transmits multiple data streams through multiple transmit antennas.

In the spatial multiplexing scheme, the number of simultaneously transmitted data streams is called a spatial multiplexing rate. The spatial multiplexing rate should be appropriately selected according to the number of transmit and receive antennas and to a channel state. Generally, the spatial multiplexing rate which can maximally be obtained is limited to a smaller value of the number of transmit antennas and the number of receive antennas. If correlation of a channel is increased, a low spatial multiplexing rate is used.

When employing the spatial multiplexing scheme, various gains can be obtained by applying a virtual antenna signaling scheme. For example, since channel environments of multiple data streams become the same by application of the virtual antenna signaling scheme, robust channel quality information (CQI) can be provided and the reliability of a data stream having a bad channel state can be increased.

Further, a transmit power of physical antennas to which a virtual antenna signaling scheme is applied can be nearly uniformly maintained. In more detail, sets of physical transmit antennas form a plurality of beams each corresponding to a virtual antenna. Different beams are generated not only to transmit the same power from all the physical antennas but also to reserve a channel characteristic.

The total number of virtual antennas determines an available spatial diversity or spatial multiplexing rate. Moreover, the total number of virtual antennas determines the amount of overhead required to measure space channels. Hereinbelow, the number of physical transmit antennas is denoted by Mr, the number of available virtual transmit antennas is denoted by Me, and the number of simultaneously transmitted layers is denoted by M. The layer indicates a transmission symbol which is independently coded and modulated for transmission.

Meanwhile, a precoding scheme refers to a spatial processing scheme to raise the reliability of a communication system and to improve transmission efficiency. The precoding scheme can be used irrespective of a spatial multiplexing rate in a multiple antenna system and increases a signal-to-noise ratio (SNR) of a channel. Generally, a transmitting side multiplies the most proper matrix or vector in a current channel environment by data for transmission. The multiplied matrix or vector is fed back from a receiving side. If the transmitting side can determine channel information of a downlink, a proper matrix or vector can be selectively used.

DISCLOSURE

Technical Problem

An object of the present invention is to provide a method for transmitting a precoded signal in a collaborative MIMO communication system.

Technical Solution

The object of the present invention can be achieved by providing a method for receiving a precoded signal in a collaborative MIMO communication system. The method includes estimating, by a mobile station, channels for one or more base stations through signals received from the one or more base stations including a serving base station, transmitting precoding matrix indexes of the one or more base stations determined based on the estimated channels to the serving base station, and receiving signals precoded by the one or more base stations based on the precoding matrix indexes.

The precoding matrix indexes may be transmitted as channel information together with at least one of channel quality information and rank information.

The precoded signals may be transmitted through one or more virtual antennas, and the virtual antennas may be constructed with beams generated by being multiplied by antennas weights for beamforming.

The precoding matrix indexes may be determined for a virtual antenna group including the one or more virtual antennas using a codebook included commonly in the one or more base stations.

The serving base station may transmit an antenna weight applied to a virtual antenna of a corresponding base station, or a row index to the one or more base stations through a backbone network, wherein the antenna weight and the row index are determined with respect to a precoding matrix according to the precoding matrix indexes, or precoding matrix indexes in collaborative MIMO using the virtual antenna group.

The mobile station may be located in an edge of a cell in a multi-cell environment.

In another aspect of the present invention, provided herein is a method for transmitting a precoded signal in a collaborative MIMO communication system, including receiving precoding matrix indexes for a serving base station and one or more neighboring base stations from a mobile station, transmitting the received precoding matrix indexes to corresponding base stations through a backbone network, precoding signals based on the precoded matrix indexes, and transmitting the precoded signals to the mobile station.

The precoding matrix indexes may be transmitted as channel information together with at least one of channel quality information and rank information.

The precoding matrix indexes may be determined using a codebook included commonly in the serving base station and the one or more neighboring base stations.

The method may further include estimating a channel through a signal received from the mobile station, determining an antenna weight for beamforming based on the estimated channel, and multiplying the antenna weight by the precoded signal.

The mobile station may be located in an edge of a cell in a multi-cell environment.

Advantageous Effects

According to the present invention, a precoded signal can be efficiently received in a collaborative MIMO communication system.

When a plurality of base stations transmit a data signal to one mobile station in a multi-cell environment, the base stations can perform precoding by sharing precoding matrix information transmitted from the mobile station by a closed-loop scheme. Therefore, the base stations can increase reception performance of a mobile station by maintaining a unitary property between signals transmitted to the mobile station.

Moreover, since each base station performs beamforming using a plurality of antennas, each base station can transmit data using one antenna, thereby amplifying the strength of a signal transmitted to a mobile station. Furthermore, interference which may be generated between signals of a plurality of base stations transmitted to the mobile station can be reduced.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description will be given centering on specific terms, but the present invention is not limited thereto and any other terms may be used to represent the same meanings.

In some instances, known structures and/or devices are omitted or are shown in block diagram and/or flow chart form, focusing on important features of the structures and/or devices, so as not to obscure the concept of the present invention. The same reference numbers will be used throughout this specification to refer to the same or like parts.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the term 'base station' refers to a terminal node of a network communicating directly with the mobile station. In some cases, a specific operation described as performed by the base station may be performed by an upper node of the base station. Namely, it is apparent that, in a network comprised of a plurality of network nodes including a base station, various operations performed for communication with a mobile station may be performed by the base station, or network nodes other than the base station. The term 'base station' (BS) may be replaced with the term 'fixed station', 'Node B', 'eNode B' (eNB), 'access point', etc. The term 'mobile station' (MS) may be replaced with the term 'user equipment', 'mobile subscriber station' (MSS), etc.

In case of a communicating mobile station, especially, in an edge of each cell in a multi-cell environment, a signal transmitted from a serving BS to the mobile station is weak in strength and a probability of generating interference is high due to signals transmitted to the mobile station from other neighboring BSs. Accordingly, the mobile station in an edge of a cell may improve reception performance of a user through collaborative MIMO as will be described hereinbelow, in consideration of a communication environment.

Figure 1:
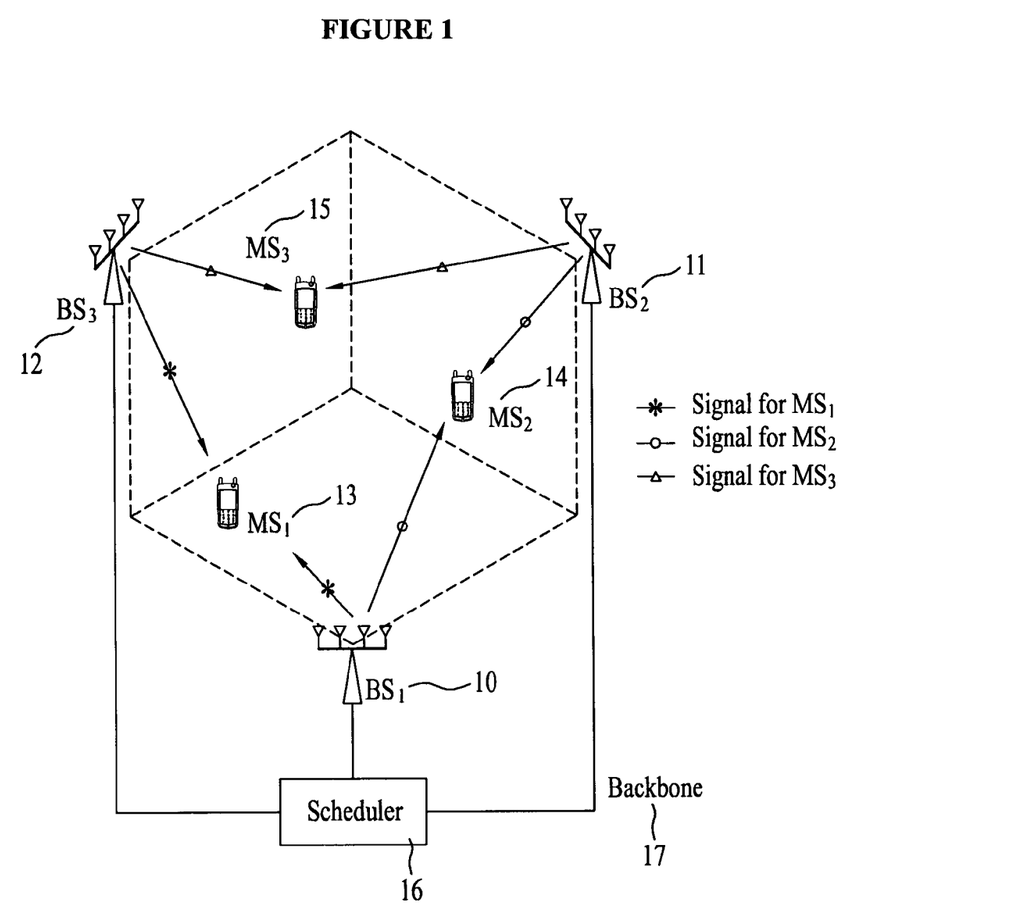
FIG. 1 is a diagram explaining a signal transmission and reception method in a communication system applying a MIMO scheme in a multi-cell environment.

FIG. 1 is a diagram explaining a signal transmission and reception method in a communication system applying a MIMO scheme in a multi-cell environment.

According to a MIMO scheme shown in FIG. 1, MIMO is applied using a plurality of base stations (BSs) in a multi-cell environment, unlike conventional application of MIMO in units of a single cell to achieve diversity, single-user MIMO, and multi-user MIMO.

Referring to FIG. 1, a mobile station (MS) ($MS_1$) 13 receives signals from BSs ($BS_1$ and $BS_3$) 10 and 12, an MS ($MS_2$) 14 receives signals from BSs ($BS_1$ and $BS_2$) 10 and 11, and an MS ($MS_3$) 15 receives signals from BSs ($BS_2$ and $BS_3$) 11 and 12. Data transmitted to an MS from a plurality of BSs is constructed in a scheduler 16 considering the plurality of BSs and then is transmitted to each BS through a backbone network 17.

Signals received from the respective BSs may be the same or different. When the same data is received from the respective BSs, a diversity gain can be obtained. When different data is received from the respective BSs, a data transmission rate, that is, data processing amount can be raised.

Similarly to raising reception performance of the MS by single-user MIMO or multi-user MIMO through multiple antennas of a BS in the same cell, the MS can implement diversity, single-user MIMO, or multi-user MIMO by receiving a signal for the same channel from BSs located in a plurality of neighboring cells. Especially, a MS in an edge of a cell which is liable to be subject to interference from neighboring cells may implement, when employing this situation in reverse, diversity, single-user MIMO, or multi-user MIMO by receiving a signal for the same channel from neighboring BSs.

Since a plurality of independent streams are transmitted to multiple MSs or a specific MS, when a collaborative MIMO scheme is applied to implement single-user MIMO or multi-user MIMO, a plurality of BSs may receive channel state information (CSI) from the MSs and estimate a channel using the CSI. Each BS independently generates an antenna weight based on the channel estimation result, performs precoding, and transmits a precoded signal.

However, since respective BSs independently generate precoding vector values using channel values estimated according to channel estimation related information received from the MSs, signals between BSs, corresponding to precoding antenna vectors, may not have a unitary property. Thus if the unitary property between the precoding vectors generated from a plurality of BSs is not maintained, it is difficult to maximize a parameter value such as a minimum chordal distance. Accordingly, a characteristic of reception performance may be degraded in a communication system transmitting a plurality of data streams to one MS.

In the exemplary embodiments of the present invention, as will be described hereinbelow, a signal transmission method is provided which can maintain a unitary property in a plurality of BSs through a closed-loop operation using a codebook, in using a signal transmission and reception method in a communication system applying a collaborative MIMO scheme.

Figure 2A:
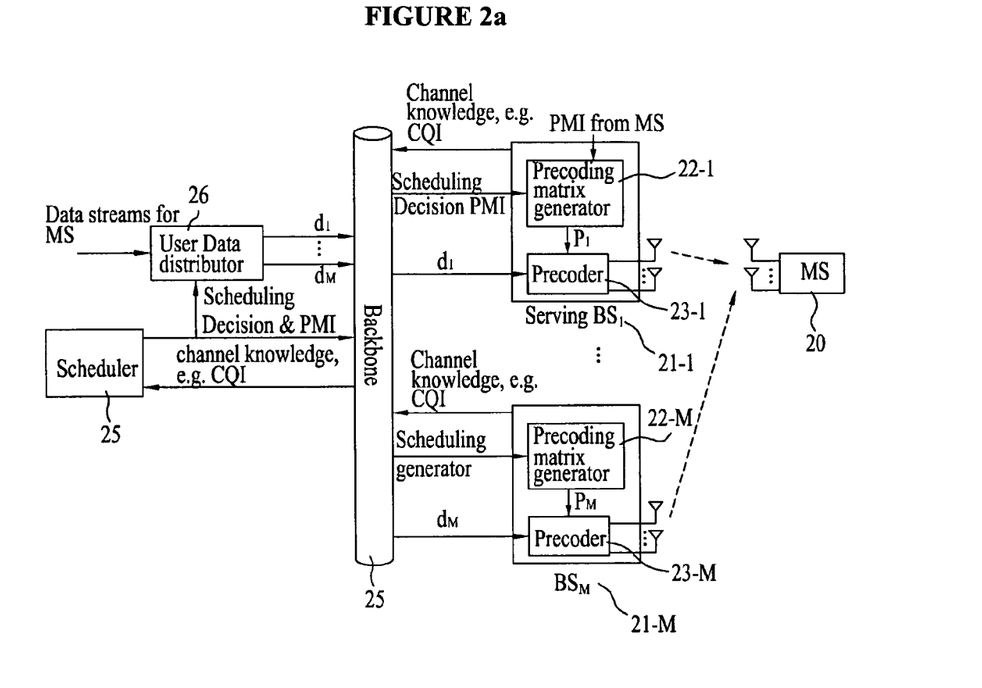
FIGS. 2a and 2b are diagrams explaining a signal transmission and reception method in a communication system applying a collaborative MIMO scheme according to an exemplary embodiment of the present invention.
Figure 2B:
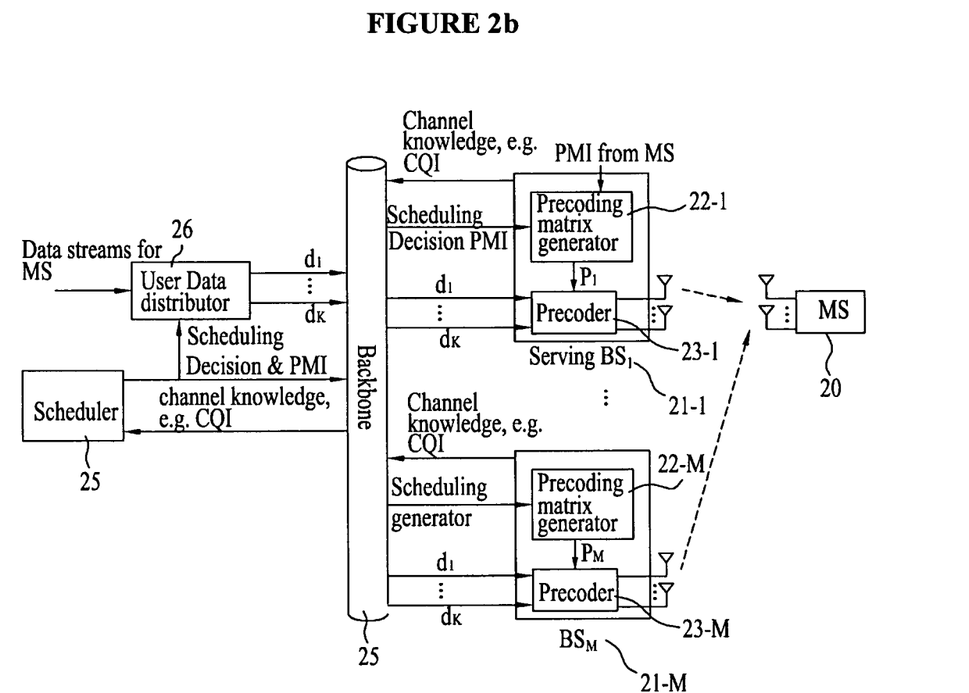

FIGS. 2a and 2b are diagrams explaining a signal transmission and reception method in a communication system applying a collaborative MIMO scheme according to an exemplary embodiment of the present invention.

FIG. 2a illustrates a method for simultaneously transmitting one data stream to a specific MS through a plurality of BSs when a rank of each BS is 1. In FIG. 2a, M BSs, including a serving BS ($BS_1$) 21-1 of an MS 20 and (M−1) neighboring BSs, transmit data to the MS 20. In this case, the serving BS 21-1 to the neighboring BS ($BS_M$) 21-M transmit, to the MS 20, a data stream d which is constructed based on information received by a scheduler 25 and transmitted through a backbone network 24.

The construction of each BS transmitting data will now be described in detail by way of example of the BS 21-1 among a plurality of BSs. The BS 21-1 receives the data stream d through the backbone network 24 and then precodes the data stream d before transmission to the MS 20. A precoding matrix generator 22-1 generates a weight or a precoding matrix used to perform precoding.

The precoding matrix generator 22-1 may generate the weight or precoding matrix using a codebook. For example, the MS 20 transmits a precoding matrix index (PMI) as feedback information and the precoding matrix generator 22-1 may generate the precoding matrix using the PMI received as the feedback information from the MS 20.

A precoder 23-1 performs precoding by multiplying the generated weight or precoding matrix by the data stream d. The precoder 23-1 then transmits the precoded signal to the MS 20.

According to this embodiment, when a BS, especially, the serving BS 21-1 receives the PMI as the feedback information from the MS 20, the serving BS 21-1 may receive PMIs for neighboring BSs including the BS 21-M, as well as a PMI therefor, so that each BS can generate the precoding matrix using the PMI.

The serving BS 21-1 transmits the PMIs for the BSs to corresponding BSs through the backbone network 24. The backbone network 24 may be a communication network defined to transmit/receive and share information between a plurality of neighboring BSs. At this time, the scheduler 25 may coordinate transmission of the PMIs.

The scheduler 25 may receive, through the backbone network 24, channel information obtained through a signal received by each BS from an MS and may construct data transmitted to a corresponding MS using the channel information. The channel information may include channel quality information (CQI) and rank information, as well as the above-described PMI. Through the channel information, the scheduler 25 selects optimal coding and modulation schemes suitable for a channel state of a corresponding MS and may transmit data constructed using the coding and modulation schemes to each BS through the backbone network 24 and further to an MS.

As another method, an MS may directly transmit a PMI for each BS through an uplink channel allocated from each neighboring BS to each BS without passing through the serving BS and the backbone network 24.

FIG. 2b illustrates a method for transmitting the same data to a specific MS through a plurality of BSs when a rank of each BS is above 1. The construction of FIG. 2b performs the same operation as the above-described operation of FIG. 2a. However, each BS transmits one data stream in FIG. 2a, whereas each BS transmits one or more data streams in FIG. 2b.

In FIG. 2b, a scheduler 25 may receive rank information for each BS and construct a data stream for each BS according to a rank of each BS. For instance, when a rank of a BS $BS_1$ is K1, K1 data streams are constructed and then transmitted to the BS $BS_1$. When a rank of a BS $BS_M$ is KM, KM data streams are constructed and then transmitted to the BS $BS_M$.

In FIGS. 2a and 2b, diversity or MIMO may be implemented through multiple antennas provided for each BS. Moreover, a higher transmission rate can be obtained by transmitting a plurality of data streams to a plurality of BSs as illustrated in FIG. 2b.

The following Equation 1 represents an example of a transmission signal generated by the precoder 23-1 by multiplying a precoding matrix based on a PMI transmitted from an MS by a data stream.

$$S_m(t)=P_m d(t) \qquad \text{[Equation 1]}$$

where m denotes a BS index allocated to a plurality of BSs, $S_m(t)$ denotes a transmission signal transmitted by a BS $BS_m$, $P_m$ denotes a precoding matrix generated by a precoding matrix generator 22-m of the BS $BS_m$, and d(t) denotes a transmission data stream received from the scheduler 25.

In Equation 1, if the number of transmission data streams is k (where k=1, . . . , K), $P_m$ may be constructed as a plurality of columns such as $P_m = [P_{m1}, P_{m2}, \ldots, P_{mK}]$ and $P_m$ indicates a precoding matrix applied to a transmission data stream transmitted through antennas of the BS $BS_m$. Precoding matrices comprised of k column vectors within a codebook for the total number k of transmission data streams may be expressed as follows.

$$P_1=[P_{11}, P_{12}, \ldots, P_{1K}],$$

$$P_2=[P_{21}, P_{22}, \ldots, P_{2K}],$$

$$\ldots$$

$$P_M=[P_{M1}, P_{M2}, \ldots, P_{MK}] \qquad \text{[Equation 2]}$$

Figure 3:
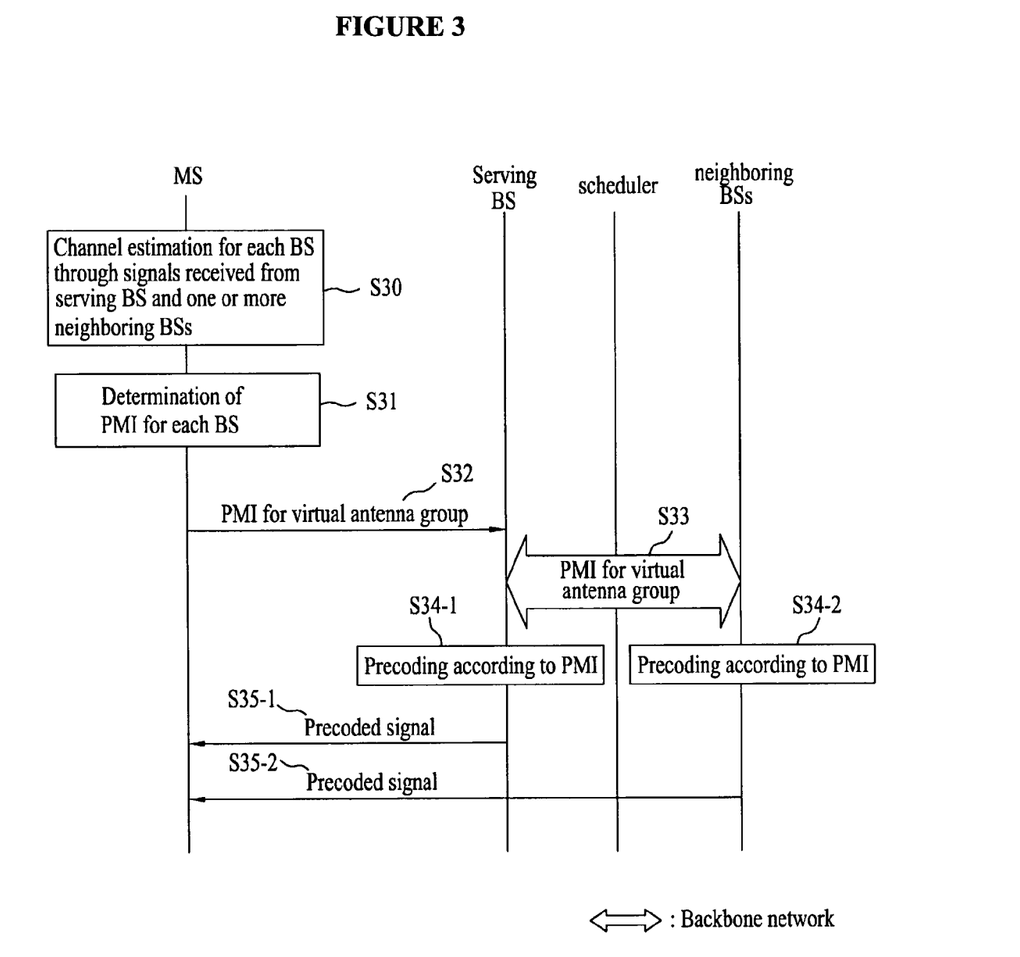
FIG. 3 is a flow diagram explaining a signal transmission and reception method in a communication system applying a collaborative MIMO scheme according to an exemplary embodiment of the present invention.

FIG. 3 is a flow diagram explaining a signal transmission and reception method in a communication system applying a collaborative MIMO scheme according to an exemplary embodiment of the present invention.

An MS receives signals from a serving BS and one or more neighboring BSs and estimates channels for BSs in step S30. According to this embodiment, an MS located in an edge of a cell may estimate channels for the neighboring BSs as well as a channel for the serving BS.

In step S31, the MS determines a PMI for each BS in a codebook using the estimated channel information for each BS. In this case, a plurality of PMIs may be determined by determining PMIs for respective BSs. In step S32, the MS transmits the PMI for each BS to the serving BS. In this case, CQI and rank information as channel information of each BS as well as the PMI for each BS may be transmitted to the serving BS.

If the serving BS receives channel information for neighboring BSs as well as channel information therefor from the MS, the serving BS transmits the channel information to a scheduler through a backbone network and the scheduler transmits the channel information to a corresponding BS, in step S33. Alternatively, the serving BS may transmit the channel information for neighboring BSs to neighboring BSs through the backbone network.

Each BS, which has received a data stream constructed according to the channel information, especially the PMI and the rank information, performs precoding by multiplying a precoding matrix by the data stream in steps S34-1 and S34-2. In steps S35-1 and 35-2, each BS transmits a precoded data signal to the MS.

Figure 4A:
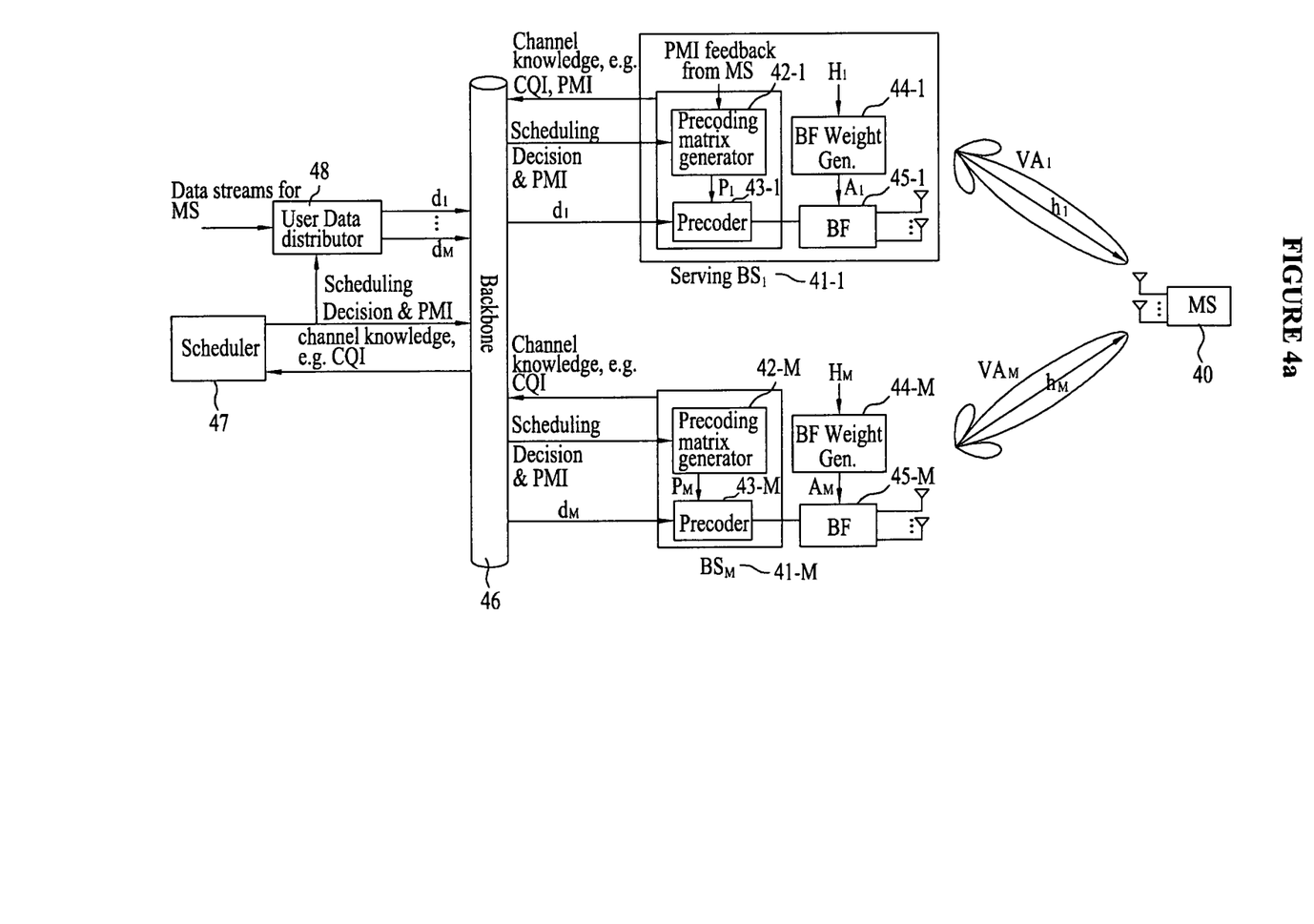
FIGS. 4a and 4b are diagrams explaining a signal transmission and reception method in a communication system applying a collaborative MIMO scheme according to another exemplary embodiment of the present invention.
Figure 4B:
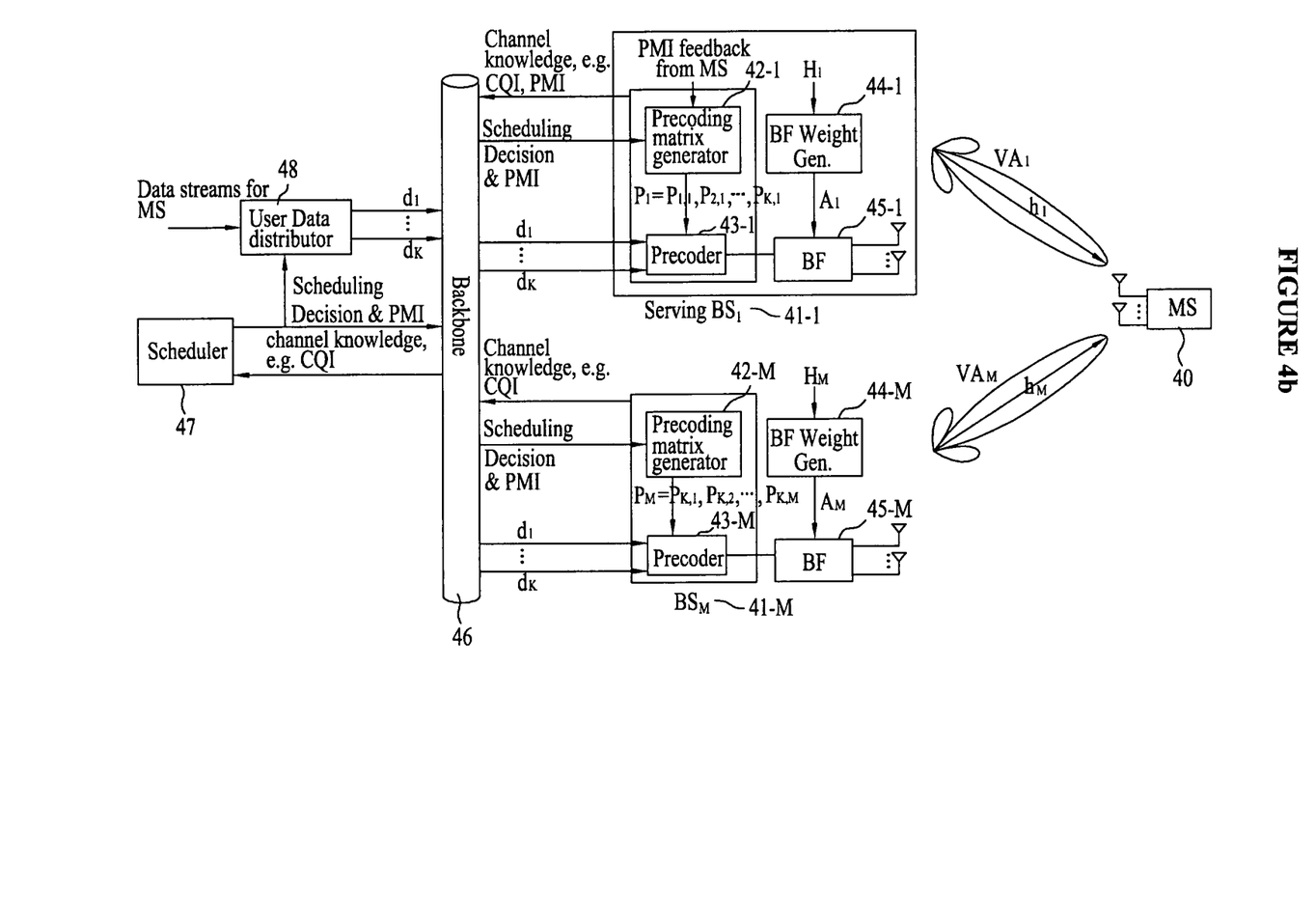

FIGS. 4a and 4b are diagrams explaining a signal transmission and reception method in a communication system applying a collaborative MIMO scheme according to another exemplary embodiment of the present invention.

FIGS. 4a and 4b illustrate a method for transmitting a signal by constructing each BS with virtual antennas through a beamforming scheme when each BS includes a plurality of antennas, in a signal transmission and reception method in a communication system applying a collaborative MIMO scheme.

Hereinafter, the configuration and operation described with reference to FIG. 2a will be explained in brief, and beamforming (BF) weight generators 44-1 to 44-M and beamforming units 45-1 to 45-M, which are related to a beamforming scheme according to the embodiment of the present invention, will be described in detail centering on a BS ($BS_1$) 41-1 among a plurality of BSs as in FIG. 2a.

FIG. 4a illustrates a method for transmitting the same data stream to a specific MS through a plurality of BSs when a rank of each BS is 1. As described in the above embodiment, a serving BS ($BS_1$) 41-1 receives PMIs, CQI, and rank information, for virtual antennas of the serving BS 41-1 and other neighboring BSs, from an MS and shares or transmits the received PMIs, CQI and rank information through a backbone network 46. Each BS can perform precoding according to received precoding information.

According to this embodiment, precoding matrix information transmitted to each BS may be a weight allocated to each BS with respect to one precoding matrix P selected from the same codebook or may be a row index of the precoding matrix. Namely, the serving BS $BS_1$ and neighboring BSs use the same codebook with respect to a corresponding MS and the MS regards each BS as one antenna to determine one precoding matrix P. The MS transmits the precoding matrix to the serving BS $BS_1$. The serving BS $BS_1$ may transmit a weight p of the precoding matrix P for each BS or a row index of the precoding matrix to each BS through the backbone network 46.

Alternatively, the MS may directly transmit the weight value of the precoding matrix for a corresponding BS or the row index of the precoding matrix to each BS through an uplink channel allocated from each neighboring BS without passing through the serving BS and the backbone network 46.

The beamforming weight generator 44-1 of the serving BS 41-1 estimates a channel for a corresponding MS and generates a weight for performing beamforming based on the estimated channel. The beamforming weight generator 44-1 may use channel estimation related information received from the MS. The beamforming unit 45-1 multiplies the weight value generated from the beamforming weight generator 44-1 by a precoded signal.

FIG. 4b illustrates a method for transmitting a plurality of data streams to a corresponding MS as an example of performing collaborative MIMO using a plurality of BSs when a rank of each BS is 2 or more. The construction of FIG. 4b performs the same operation as the above-described operation of FIG. 4a. However, each base station transmits one data stream in FIG. 4a and transmits a plurality of data streams in FIG. 4b, thereby implementing diversity or MIMO through multiple antennas provided for each BS.

The following Equation 3 represents an example of a transmission signal when a signal is transmitted by applying a beamforming scheme to a data stream multiplied by a precoding matrix based on a PMI transmitted by an MS.

$$S_i(t)=A(\theta_{AoDi})p_i D \qquad \text{[Equation 3]}$$

where $\theta_{AoDi}$ denotes an angle of departure (AoD) in an antenna array of a BS, and $A(\theta_{AoDi})$ denotes a weight for performing beamforming with respect to a virtual antenna $VA_i$ implemented in a BS $BS_m$.

Further, $p_i$ denotes a weight applied to each BS constructed with the virtual antenna $VA_i$ in a precoding matrix determined to perform collaborative MIMO, specifically $p_i$ denotes a row component of the determined precoding matrix. Subscript i denotes a row index related to the weight applied to each BS constructed with virtual antennas in a precoding matrix determined to perform collaborative MIMO and indicates an example of using the same index as the virtual antenna by allocating one row per virtual antenna. D denotes a multiple data stream $d_1, d_2, \ldots, d_k$ transmitted when a rank is k.

The precoding matrix indexes for the respective BSs are used in FIGS. 2a and 2b, whereas the same precoding matrix index for the same codebook is used for all neighboring BSs in FIGS. 4a and 4b. That is, in FIGS. 4a and 4b, each BS is constructed with one virtual antenna and one precoding matrix index applied to a plurality of virtual antennas is determined. Each BS may multiply a row vector component of a determined precoding matrix corresponding thereto by a weight and transmit the multiplied result to an MS.

In a method for a BS to transmit a signal by implementing a virtual antenna using a beamforming scheme, each BS may use a plurality of virtual antennas.

Figure 5A:
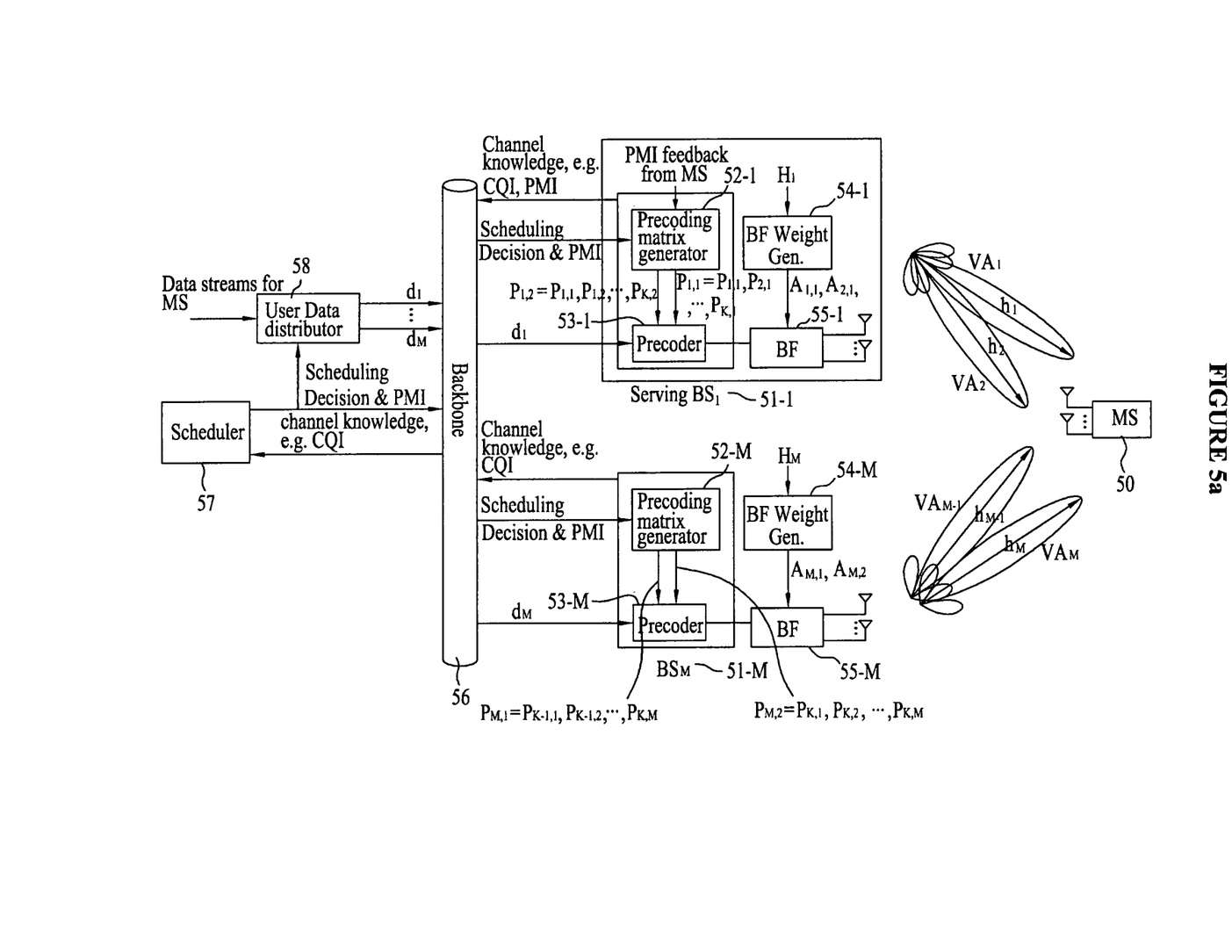
FIGS. 5a and 5b are diagrams explaining a signal transmission and reception method in a communication system applying a collaborative MIMO scheme according to a further exemplary embodiment of the present invention.
Figure 5B:
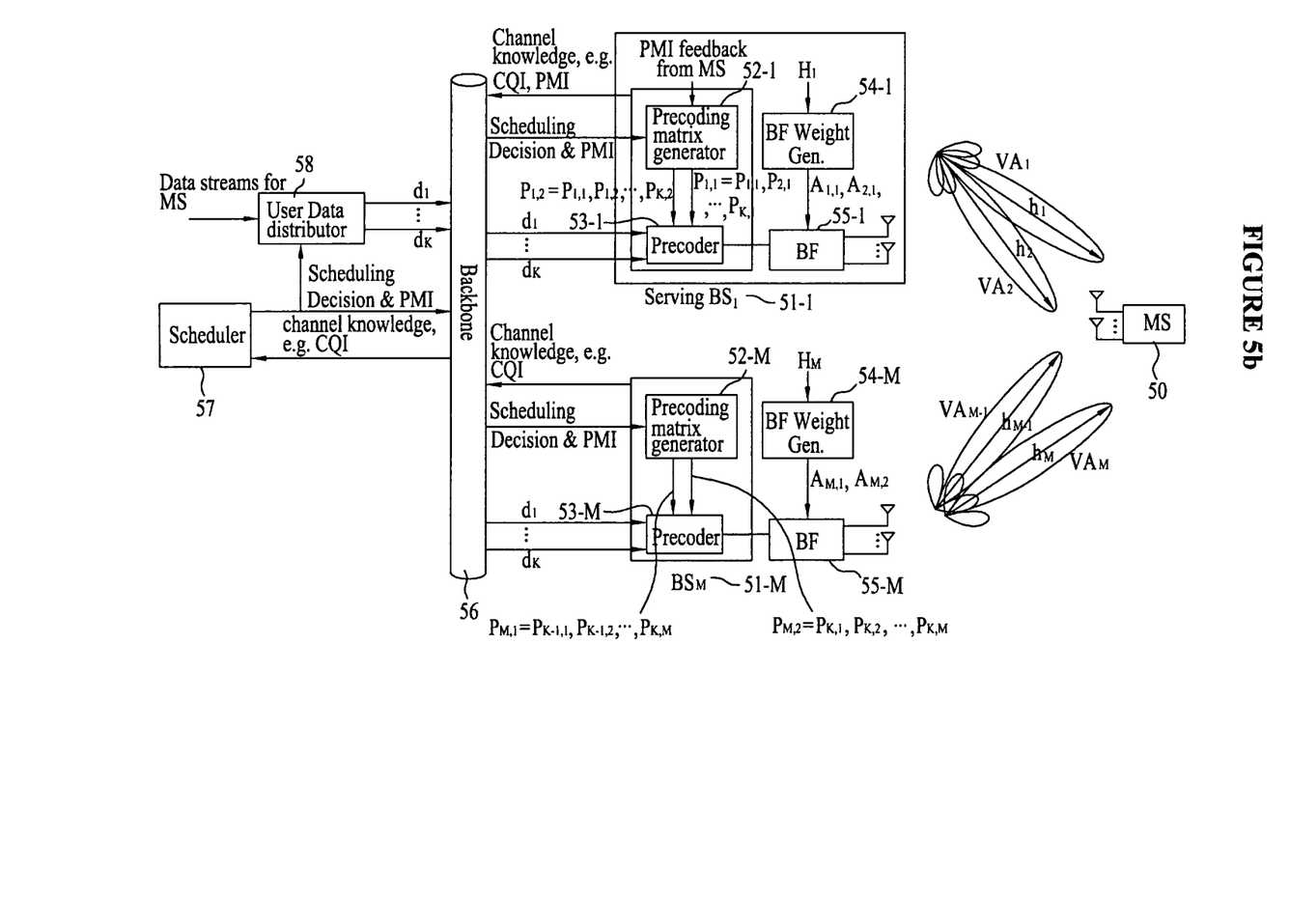

FIGS. 5a and 5b are diagrams explaining a signal transmission and reception method in a communication system applying a collaborative MIMO scheme according to a further exemplary embodiment of the present invention.

FIGS. 5a and 5b illustrate the case where each BS is constructed with a plurality of antennas, in a method for transmitting and receiving a signal by constructing virtual antennas through a beamforming scheme in a communication system applying a collaborative MIMO scheme An antenna array provided for each BS may be constructed with a plurality of virtual antennas constituting one group or with a plurality of virtual antennas divided into antenna groups having an interval of $4\lambda$.

Since the construction of each of FIGS. 5a and 5b is the same as the above-described construction, a description thereof is omitted. However, a plurality of virtual antennas are used in FIGS. 5a and 5b, a size or configuration of precoding matrices and weight values generated from precoding matrix generators 52-1 to 52-M and beamforming weight generators 54-1 to 54-M may be different.

If one BS, for example, a BS $BS_m$ uses a plurality of virtual antennas $VA_{m\_1}, VA_{m\_2}, \ldots, VA_{m\_i}$, a transmission signal transmitted by the BS may be represented by the following Equation 4.

$$S_m(t) = A(\theta_{AoDm\_1})P_{m\_1}D + A(\theta_{AoDm\_2})P_{m\_2}D + \ldots, \\ + A(\theta_{AoDm\_i})P_{m\_i}D \quad \text{[Equation 4]}$$

where $A(\theta_{AoDm\_1}), A(\theta_{AoDm\_2}), \ldots, A(\theta_{AoDm\_i})$ indicate weights applied to virtual antennas of $VA_{m\_1}, VA_{m\_2}, \ldots, VA_{m\_i}$ to perform beamforming, and $p_{m\_1}$, and $p_{m\_2}$ to $p_{m\_i}$ indicate row components of a precoding matrix applied to a signal transmitted through each virtual antenna of $VA_{m\_1}, VA_{m\_2}, \ldots, VA_{m\_i}$ in a base station $BS_m$.

If a rank is k (where k is 2 or more) as illustrated in FIG. 5b, D denotes multiple data streams $d_1, d_2, \ldots, d_k$. Even in this case, if the number of transmission data streams transmitted through virtual antennas of $VA_{m\_1}, VA_{m\_2}, \ldots, VA_{m\_i}$ in the base station $BS_m$ is k, $p_{m\_i}$ may be constructed by k columns such as $p_{m\_i} = [p_{m\_i1}, p_{m\_i2}, \ldots, p_{m\_iK}]$.

Figure 6:
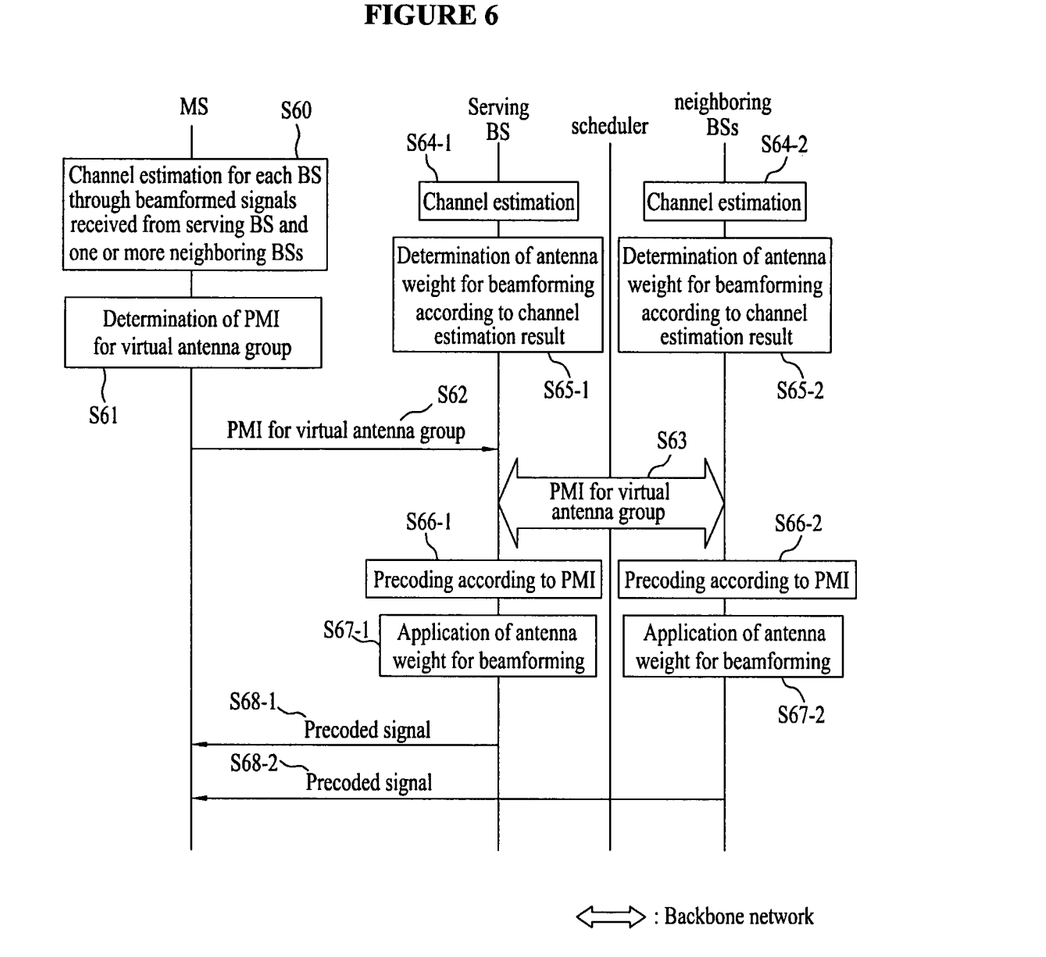
FIG. 6 is a flow diagram explaining a signal transmission and reception method in a communication system applying a collaborative MIMO scheme according to another exemplary embodiment of the present invention.

FIG. 6 is a flow diagram explaining a signal transmission and reception method in a communication system applying a collaborative MIMO scheme according to another exemplary embodiment of the present invention.

An MS receives beamformed signals from a serving BS and one or more neighboring BSs and estimates channels for BSs in step S60. If an MS is located in an edge of a cell, the MS can obtain higher performance by beamforming. According to this embodiment, an MS, especially one located in an edge of a cell may estimate channels for the neighboring BSs as well as a channel for the serving BS.

In step S61, the MS determines a PMI for a virtual antenna group comprised of virtual antennas of each BS using the estimated channel information for BSs. In step S62, the MS transmits the PMI applied to the virtual antenna group of BSs for performing collaborative MIMO to a serving BS. At this time, CQI and rank information as well as the PMI for the virtual antenna group may be transmitted as channel information for collaborative MIMO. A plurality of neighboring BSs for performing collaborative MIMO may use the same codebook for a corresponding MS. Each BS may be regarded as one antenna, an antenna group, or a virtual antenna. Each BS can perform precoding by each vector component of a precoding matrix determined by one PMI.

The serving BS, which has received channel information therefor and channel information for neighboring BSs, transmits the channel information to a scheduler through a backbone network in step S63. The scheduler transmits the channel information to a corresponding BS. Alternatively, the serving BS may transmit channel information for neighboring BSs through the backbone network to the neighboring BSs.

In this embodiment, each BS estimates a channel for a corresponding MS using a signal or channel estimation related information received from the MS in steps S64-1 and S64-2. In steps S65-1 and S65-2, each BS determines an antenna weight for beamforming according to the channel estimation result. The antenna weight may be determined as a value having maximum signal strength and minimum interference with neighboring BSs, in consideration of the location of an MS and relationship with other BSs.

Each BS receiving the antenna weight of a corresponding virtual antenna according to the PMI performs precoding by multiplying the antenna weight allocated to the corresponding virtual antenna by data in step S66-1 and S66-2. Each BS applies the antenna weight for beamforming in S67-1 and S67-2. That is, a precoded signal is multiplied by the antenna weight for beamforming. In steps S68-1 and S68-2, the precoded data signal is transmitted to the MS.

As described above, when a plurality of BSs transmit a data signal to one MS in a multi-cell environment, the BSs share precoding matrix information transmitted from the MS by a closed-loop scheme and thus maintain a unitary property between signals transmitted to the MS, thereby improving reception performance of the MS.

Since each BS transmits data by performing beamforming using a plurality of antennas, signal strength transmitted to the MS is amplified and interference which may be generated between signals of a plurality of BSs can be reduced.

The present invention may be embodied by a combination of claims which do not have an explicit cited relation in the appended claims or may include new claims by amendment after application.

The exemplary embodiments of the present invention may be achieved by various means, for example, hardware, firmware, software, or a combination thereof. In a hardware configuration, a method for receiving a precoded signal in a collaborative MIMO communication system according to the exemplary embodiment of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method for receiving a precoded signal in a collaborative MIMO communication system according to the exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention may be applied to devices used in a collaborative MIMO communication system.

The invention claimed is:

1. A method for improving throughput of receiving signals by a mobile station in a collaborative multiple-input multiple-output (MIMO) communication system, the method comprising:
   estimating, by the mobile station, channels for each of a serving base station and at least one neighboring base station;
   determining, by the mobile station, precoding matrix indexes (PMIs) corresponding to each of the serving base station and the at least one neighboring base station based on the estimated channels; and
   transmitting, by the mobile station, the precoding matrix indexes to the serving base station; and
   receiving, by the mobile station, signals including same data from the serving base station and the at least one neighboring base station,
   wherein the signals are precoded by precoding matrixes corresponding to the precoding matrix indexes and are multiplied by values associated with phase information for the at least one neighboring base station.

2. The method according to claim 1, the step of transmitting the precoding matrix indexes comprises transmitting channel quality information corresponding to the estimated channels to the serving base station.

3. The method according to claim 1, wherein the precoding matrix indexes are determined based on a codebook included commonly in the serving base station and the at least one neighboring base station.

4. The method according to claim 1, wherein the mobile station is located at an edge of a cell in a multi-cell environment.

* * * * *